United States Patent
Takamura et al.

(10) Patent No.: US 6,440,021 B2
(45) Date of Patent: Aug. 27, 2002

(54) TENSIONER FOR APPLYING TENSION TO FORCE TRANSMITTING MEMBER

(75) Inventors: Noritoshi Takamura, Aiko-gun; Tomokazu Kaibuki, Komagane, both of (JP)

(73) Assignee: NHK Spring Co., Ltd., Yokohama (JP)

( * ) Notice: Subject to any disclaimer, the term of this patent is extended or adjusted under 35 U.S.C. 154(b) by 0 days.

(21) Appl. No.: 09/970,510

(22) Filed: Oct. 4, 2001

Related U.S. Application Data

(63) Continuation of application No. PCT/JP00/02458, filed on Apr. 14, 2000.

(30) Foreign Application Priority Data

Apr. 14, 1999 (JP) ............................................. 11-107298

(51) Int. Cl.[7] .................................................. F16H 7/08
(52) U.S. Cl. ....................................... 474/111; 474/109
(58) Field of Search ................................. 474/101, 109, 474/111, 138, 140

(56) References Cited

U.S. PATENT DOCUMENTS

| 4,959,041 A | * | 9/1990 | Ojima et al. ................ 474/111 |
| 4,995,854 A | * | 2/1991 | Ojima ......................... 474/111 |
| 5,030,170 A | * | 7/1991 | Ojima ......................... 474/111 |
| 5,033,992 A | * | 7/1991 | Ojima ......................... 474/111 |
| 5,106,344 A | * | 4/1992 | Ojima ......................... 474/138 |

FOREIGN PATENT DOCUMENTS

| JP | 55-60721 A | 5/1980 |
| JP | 3-115239 U | 11/1991 |
| JP | 6-42611 A | 2/1994 |
| JP | 8-177862 A | 7/1996 |
| JP | 10-110795 A | 4/1998 |
| JP | 10-184823 A | 7/1998 |

* cited by examiner

Primary Examiner—David A. Bucci
Assistant Examiner—Timothy McAnulty
(74) Attorney, Agent, or Firm—Frishauf, Holtz, Goodman & Chick, P.C.

(57) ABSTRACT

This tensioner comprises a casing, a first shaft member rotatably stored in the casing so as to be restrained from moving in its axial direction, a second shaft member in screwed engagement with the first shaft member, and a spring for applying a turning force to the first shaft member. The second shaft member is restrained from rotating relatively to the casing and allowed to move in the axial direction. An axial load from a force transmitting member, such as a chain or belt, acts on the first shaft member. An end face of the first shaft member touches a receiving surface of the casing across a washer. The end face receives the axial load that acts on the second shaft member. The flatness of at least the end face of the first shaft member is adjusted to 15 $\mu$m or less.

11 Claims, 10 Drawing Sheets

TENSIONER FOR APPLYING TENSION TO FORCE TRANSMITTING MEMBER

CROSS REFERENCE TO RELATED APPLICATIONS

This is a Continuation Application of PCT Application No. PCT/JP00/02458, filed Apr. 14, 2000, which was not published under PCT Article 21(2) in English.

This application is based upon and claims the benefit of priority from the prior Japanese Patent Application No. 11-107298, filed Apr. 14, 1999, the entire contents of which are incorporated herein by reference.

BACKGROUND OF THE INVENTION

1. Field of the Invention

The present invention relates to a tensioner for applying a given tension to a force transmitting member such as a camshaft driving chain or timing belt of an engine mounted in a vehicle, e.g., a four-wheeler, two-wheeler, etc.

2. Description of the Related Art

A tensioner is used to keep a chain and timing belt under a substantially fixed tension even if they are stretched or worn to be slackened during use. A conventional prevalent tensioner comprises a casing, a first shaft member having an external thread portion, a second shaft member having an internal thread portion in mesh with the external thread portion of the first shaft, a spring for urging the first shaft member in a first rotating direction, a bearing for restraining the second shaft member from rotating, etc. When the first shaft member is rotated in the first direction by means of the aforesaid spring, the second shaft member moves in the axial direction. The first shaft member is stored in the casing, and an end face of the first shaft member is in contact with the inner surface (receiving surface) of the casing.

This tensioner urges the first shaft member in the first rotating direction by means of a repulsive force (elastic energy) the aforesaid spring accumulates when it is twisted in the direction opposite to the first rotating direction. Urged by its own turning torque, the second shaft member moves in the direction to project from the casing. The distal end of the second shaft member directly or indirectly pushes a force transmitting member such as a chain or timing belt.

If the tension of the chain or timing belt increases as an engine rotates at high speed, for example, a force that pushes back the second shaft member is augmented. In this case, the second shaft member is pushed back into the casing, resisting the sum total of torques, mainly including the urging force of the aforesaid spring, frictional resistance between the aforesaid external and internal thread portions, and frictional resistance between the end face of the first shaft member and the casing. Based on these torques, the tensioner can apply a fixed tension to the chain or timing belt.

The second shaft member of the tensioner described above is expected to be able to advance and retreat smoothly depending on the tension of the chain or timing belt. In the conventional tensioner, however, frictional torque between the end face of the first shaft member and the receiving surface of the casing sometimes vary substantially. Thus, there is a problem that the second shaft member cannot advance and retreat smoothly. When the engine is in a low-speed rotation zone for idling operation or the like, in particular, the return characteristic of the second shaft member may be poor, or the initial characteristics of the tensioner may be unstable if the tensioner is a brand-new one having just started to be used. Accordingly, measures are taken to optimize the lead angle of each of the aforesaid thread portions and adjust the spring constant of the aforesaid spring. Despite these measures, however, there still remain problems that the initial characteristics of the tensioner are subject to substantial fluctuations and that the change of the frictional resistance is great.

BRIEF SUMMARY OF THE INVENTION

Accordingly, the object the of the prevent invention is to provide a tensioner designed so that its initial characteristics can be stabilized, change in its characteristics during operation can be reduced, and optimum specifications can be set corresponding to an engine in which it is attached.

In order to achieve the above object, a tensioner of the present invention comprises a casing, a first shaft member rotatably stored in the casing so as to be restrained from moving along an axis, a second shaft member in screwed engagement with the first shaft member, movable in the direction of the axis, restrained from rotating relatively to the casing, and subjected to a load in the direction of the axis from a force transmitting member, and a spring stored in the casing and capable of applying turning force to the first shaft member, characterized in that an end face of the first shaft member touches a receiving surface of the casing directly or across a washer and receives the load acting on the second shaft member, the flatness of at least the end face of the first shaft member being 15 $\mu$m or less.

In the tensioner of this invention, the axial load from the force transmitting member, e.g., a chain or timing belt, applied to the tensioner is supported by the receiving surface of the casing through the medium of the end face of the first shaft member. Since the flatness of the end face of the first shaft member is 15 $\mu$m or less, the first shaft member can rotate smoothly. As the first shaft member rotates, the second shaft member smoothly moves in the axial direction with respect to the casing, so that the return characteristic of the second shaft member is improved.

In the present invention, the end face of the first shaft member may be formed having a chamfer portion on the outer peripheral edge thereof, the flatness of the whole end face except the chamfer portion being 15 $\mu$m or less. As the first shaft member rotates around the axis with respect to the receiving surface of the casing, in this invention, the whole end face smoothly slides with respect to the casing, so that a stable return characteristic can be obtained.

In the present invention, the flatness may be adjusted so that the flatness of an annular portion of the end face extending in the circumferential direction thereof is 15 $\mu$m or less. As the first shaft member rotates around the axis with respect to the receiving surface of the casing, in this invention, the annular portion of the end face extending in the circumferential direction smoothly slides, so that a satisfactory return characteristic can be enjoyed.

Preferably, in the present invention, the surface roughness of the end face of the first shaft member should be 5 $\mu$m or less. According to this invention, the first shaft member can rotate more smoothly, so that a satisfactory return characteristic can be enjoyed.

DETAILED DESCRIPTION OF THE INVENTION

A first embodiment of the present invention will now be described with reference to FIGS. 1A to 9.

Figure 1A:
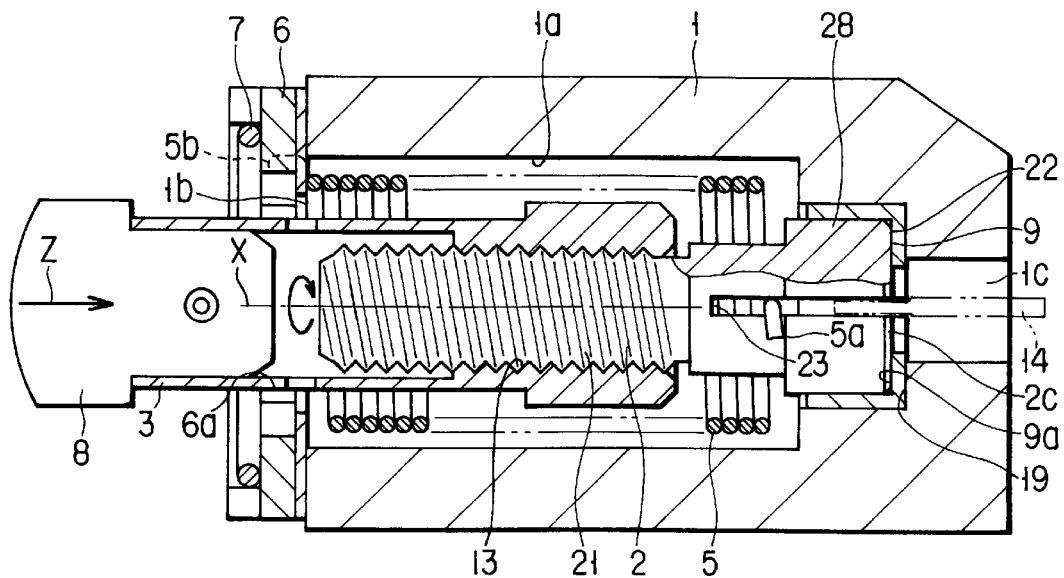
FIG. 1A is a sectional view showing a tensioner according to a first embodiment of the present invention.
Figure 1B:
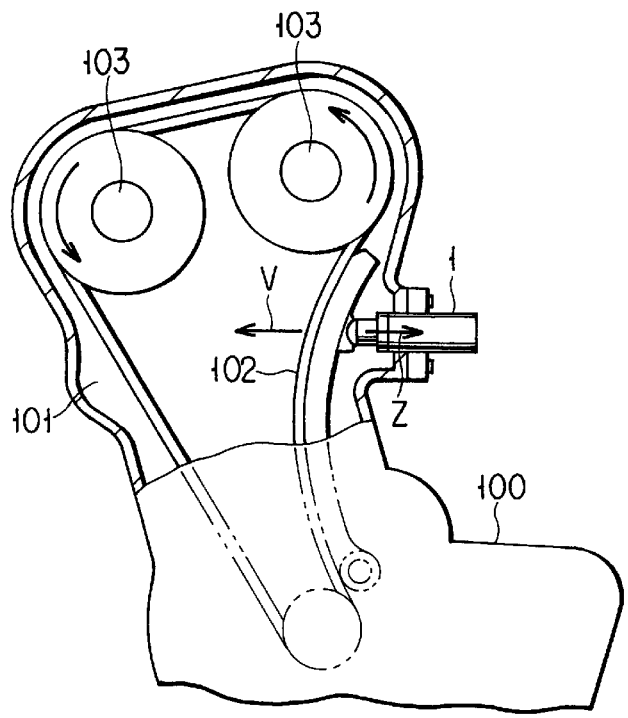
FIG. 1B is a partial sectional view of an engine showing an example of usage of the tensioner shown in FIG. 1A.

FIG. 1A shows a push-type tensioner according to the first embodiment of the present invention. This tensioner is used in a power transmission mechanism 101 of an automotive engine 100 shown in FIG. 1B, for example. The power transmission mechanism 101 transmits the rotary motion of the engine 100 to a camshaft 103 by means of an endless force transmitting member 102, such as a timing belt or chain. This tensioner is mounted in a given position on the engine 100, and pushes the force transmitting member 102 in the direction indicated by arrow V by means of a thrust, which will be mentioned later.

The tensioner shown in FIG. 1A comprises a casing 1, a first shaft member 2, and a cylindrical second shaft member 3. The first shaft member 2 is held in the casing 1. The rear end portion of the second shaft member 3 is inserted in the casing 1. The front end portion of the second shaft member 3 projects outward from the casing 1.

A cavity portion 1a for the insertion of the first and second shaft members 2 and 3 is formed in the casing 1. An opening 1b is formed in the front end portion of the casing 1, and the second shaft member 3 is designed to advance and retreat along its axis X from the opening 1b. An opening 1c is also formed in the rear end portion of the casing 1. A stopper 14 for locking and stopping the first shaft member 2 from rotation as required can be inserted into the opening 1c. A slit 23 is formed in the rear end portion of the first shaft member 2. The first shaft member 2 can be locked and stopped from rotation as the distal end of the stopper 14 is inserted into the slit 23. When the tensioner is worked, the stopper 14 is removed from the slit 23 of the shaft member 2.

An external thread portion 21 is formed on the front part of the first shaft member 2. An internal thread portion 13 is formed on the inner peripheral surface of the hollow second shaft member 3. By mating the internal thread portion 13 and the external thread portion 21 with each other, the first and second shaft members 2 and 3 can be joined together for relative rotation and screwed advance in the direction of the axis X. Usually, these thread portions 13 and 21 have a lead angle wider than those of conventional threads, and multiple threads such as triple threads are used for them.

The first and second shaft members 2 and 3 joined in this manner are inserted into a torsion spring 5. The spring 5 extends along the axis X of the shaft members 2 and 3. One end portion 5a of the spring 5 is inserted in the slit 23 of the first shaft member 2. The slit 23 extends in the direction of the axis X of the shaft member 2. The other end portion 5b of the spring 5 is anchored to the casing 1 or a bearing 6 that is attached to the casing 1. Thus, the opposite end portions 5a and 5b of the spring 5 are anchored to the shaft member 2 and the casing 1, respectively. The tip of a jig (e.g., screwdriver) for rotation is inserted into the slit 23, and the first shaft member 2 is rotated around the axis X. Thereupon, the spring 5 is twisted to store energy (torque) that urges the shaft member 2 to rotate in the opposite direction.

The bearing 6 is provided on the front end portion of the casing 1. This bearing 6 is fixed to the casing 1 by means of a fixing member such as a ring spring 7. A noncircular slide hole 6a is formed in the bearing 6. The second shaft member 3 is passed through the slide hole 6a. The outer peripheral surface of the second shaft member 3 is formed having a noncircular shape corresponding to the slide hole 6a of the bearing 6. As the second shaft member 3 is fitted in the slide hole 6a of the bearing 6, the second shaft member 3 is restrained from rotating with respect to the casing 1. A cap 8 is attached to the front end of the second shaft member 3. This cap 8 touches the timing belt or chain (shown in FIG. 1B) for use as the force transmitting member 102 directly or indirectly across an intermediate portion.

If the first shaft member 2 is rotated in a second direction to twist the spring 5, the elastic energy of the spring 5 causes the first shaft member 2 to rotate in a first direction. This rotation is transmitted to the second shaft member 3 via the thread portions 13 and 21. Since the bearing 6 restrains the second shaft member 3 from rotating, the turning force of the first shaft member 2 is converted into a propulsive force in the direction of the axis X of the second shaft member 3. Accordingly, the second shaft member 3 advances in the direction to project from the casing 1.

On the other hand, a load Z from the force transmitting member 102, formed of the timing belt or chain, is applied to the second shaft member 3 and presses the second shaft member 3 in the direction of the axis X. As this pressing force is transmitted to the first shaft member 2 via the thread portions 13 and 21, the first shaft member 2 rotates in the second direction, resisting the urging force of the spring 5. The rotation in this direction pushes back the second shaft member 3 into the casing 1. By these motions, the tension of the force transmitting member 102 can be kept substantially constant.

A large-diameter portion 28 having a diameter larger than that of the thread portion 21 is formed on the rear end portion of the first shaft member 2. A receiving surface 19 of the casing 1 that is formed around the opening 1c adjoins an end face 22 of the large-diameter portion 28. A washer 9 in the form of a bottomed ring (or cup) is located between the receiving surface 19 and the end face 22 of the first shaft member 2. The end face 22 of the first shaft member 2 is in contact with the bottom surface or a contact surface 9a of the washer 9. The aforesaid load Z that is applied to the second shaft member 3 is supported on the receiving surface 19 of the casing 1 through the end face 22 of the first shaft member 2 and the washer 9.

Since the washer 9 is interposed between the end face 22 of the first shaft member 2 and the receiving surface 19 of the casing 1 according to this embodiment, the receiving surface 19 of the casing 1 can be prevented from wearing. Accordingly, a lightweight metal, such as aluminum alloy, can be used for the casing 1. The washer 9 is formed of low-carbon steel or a material that is obtained by plating the surface of steel with a hard metal, and it is made as flat as possible for the following reason.

A chamfer portion 2c is formed on the outer peripheral edge of the end face 22 of the first shaft member 2. The flatness of the whole end face 22 of the first shaft member 2 except the chamfer portion 2c is adjusted to 15 μm or less, and preferably to 10 μm or less. Here the flatness implies the height of waviness (height of waviness in the direction of the axis X) of the end face 22.

Figure 2:
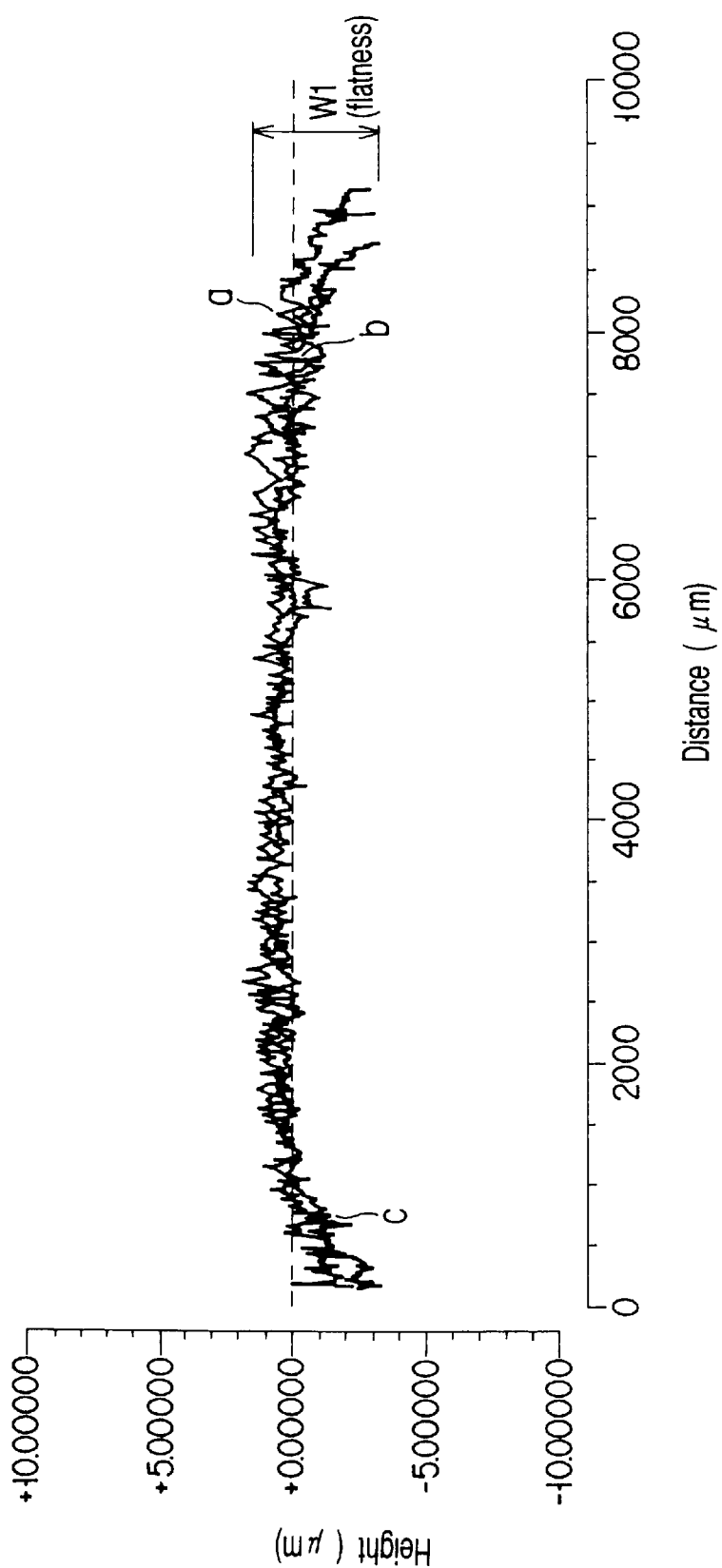
FIG. 2 is a diagram showing results of measurement of variation in the flatness of the end face of a first shaft member of the tensioner according to the aforesaid embodiment.
Figure 3:
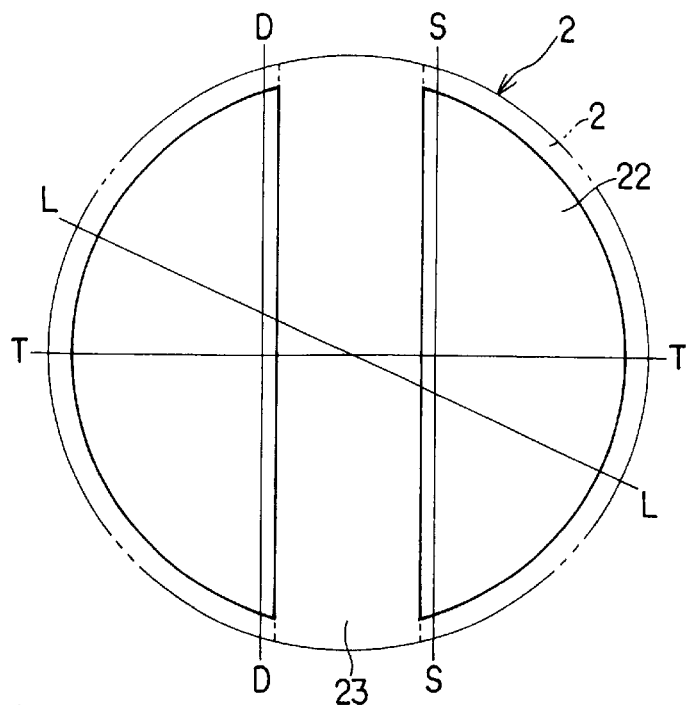
FIG. 3 is a bottom view showing measuring positions for the flatness of the end face of the aforesaid shaft member.

FIG. 2 shows results of measurement of the flatness of the end face 22 of the first shaft member 2 of the tensioner according to this embodiment by means of an optical shape measuring device. The flatness was measured by scanning lines T—T, D—D and S—S shown in FIG. 3 with the measuring head of the measuring device. Characteristic curves a, b and c shown in FIG. 2 represent the degrees of flatness measured along lines T—T, S—S and D—D, respectively. As seen from FIG. 2, the flatness according to this embodiment is within the range of 5 μm or less.

Since the flatness is improved in this manner, the whole end face 22 except the chamfer portion 2c can securely uniformly touch the contact surface 9a of the washer 9. In this case, the whole end face 22 uniformly receives the load Z, so that the load Z can be prevented from being locally unevenly distributed. If the load Z is a small load that acts when the engine rotates at low speed, as mentioned later, therefore, the first shaft member 2 can smoothly rotate resisting the urging force of the spring 5. Thus, the second shaft member 3 can smoothly return to the interior of the casing 1, so that the return characteristic of the tensioner is improved.

The operation of the tensioner according to this embodiment will now be described in accordance with data.

Figure 10:
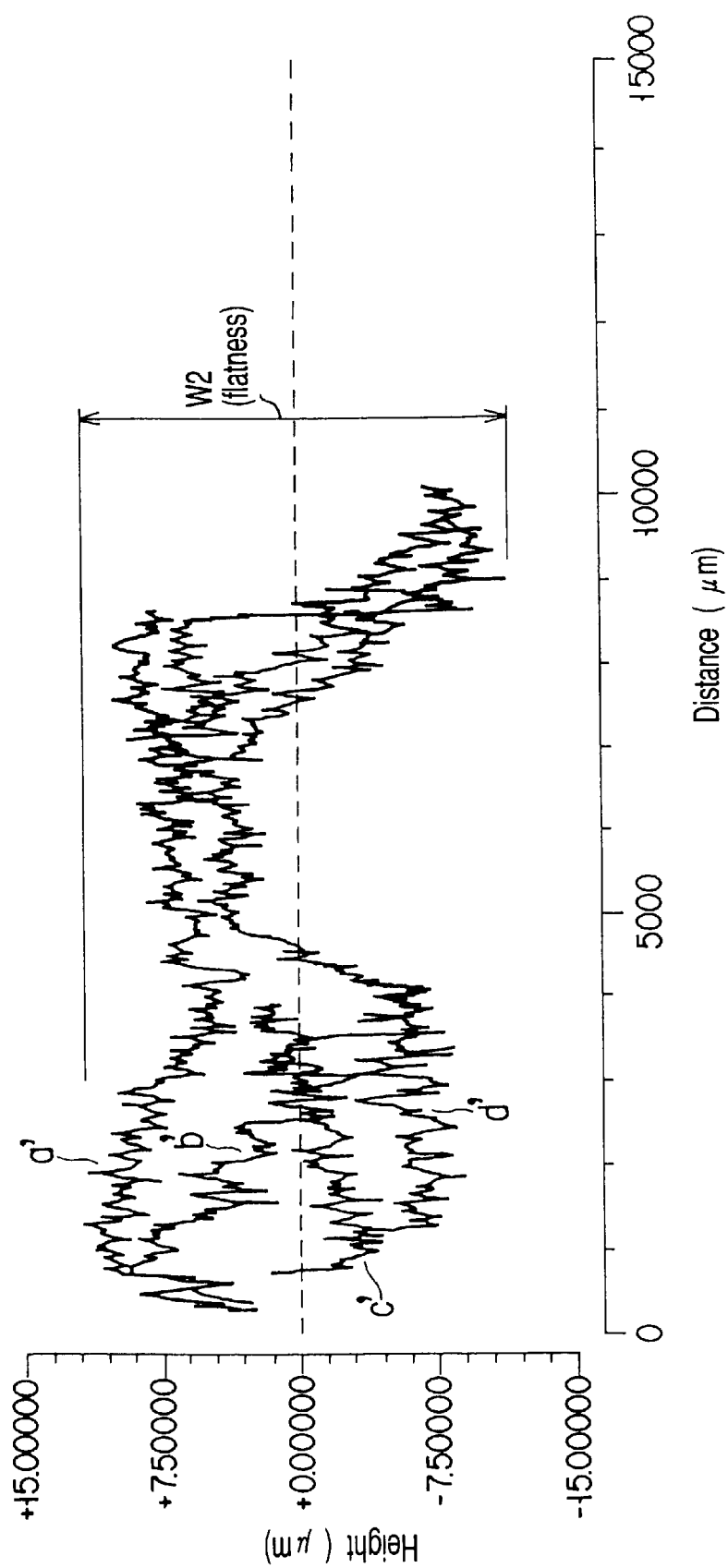
FIG. 10 is a diagram showing results of measurement of the flatness of the end face of the first shaft member in the conventional tensioner.

FIG. 10 shows results of measurement of the flatness of the end face of a first shaft member used in a conventional tensioner by means of the aforesaid measuring device. The measured conventional tensioner is constructed in the same manner as the one shown in FIG. 1 except for the flatness of the end face. In FIG. 10, characteristic curves a', b' and c' correspond to the characteristic curves a, b and c in FIG. 2, respectively. In FIG. 10, characteristic curves d' represents the degree of flatness measured along line L—L of FIG. 3. The flatness of the conventional end face shown in FIG. 10 is 22.5 μm or more. If the value of flatness of the end face is so large as in this conventional case, the frictional force (friction torque) increases locally, since the load Z that acts on the end face is locally unevenly distributed. In this case, the small load Z cannot cause the first shaft member to rotate, so that the return characteristic of the shaft member worsens.

Figure 4:
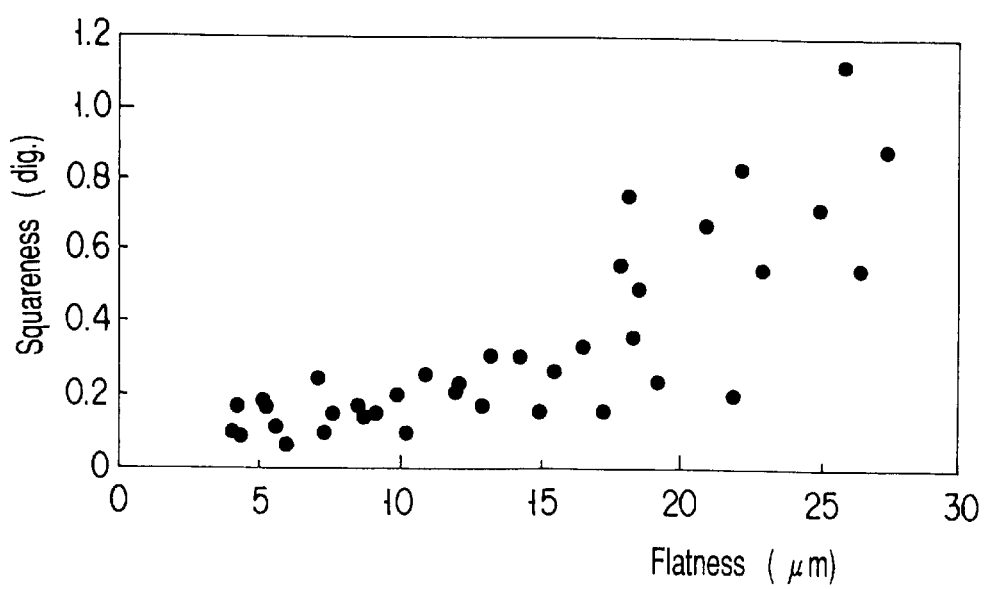
FIG. 4 is a diagram showing the relationship between the flatness and squareness of the end face of the aforesaid shaft member.

FIG. 4 shows the relationship between the flatness (height of waviness) of the end face 22 of the first shaft member 2 and the squareness of the end face 22 to the axis X of the shaft member 2. If the flatness is 15 μm or less, the squareness to the axis X is low. If the squareness is low, the whole area of the end face 22 can securely touch the contact surface 9a of the washer 9, so that the whole end face 22 can uniformly receive the load Z. Thus, the return characteristic of the second shaft member 3 is improved further. If the flatness and squareness of the end face 22 of the first shaft member 2 are lowered, the return characteristic of the second shaft member 3 can be improved further.

Figure 5:
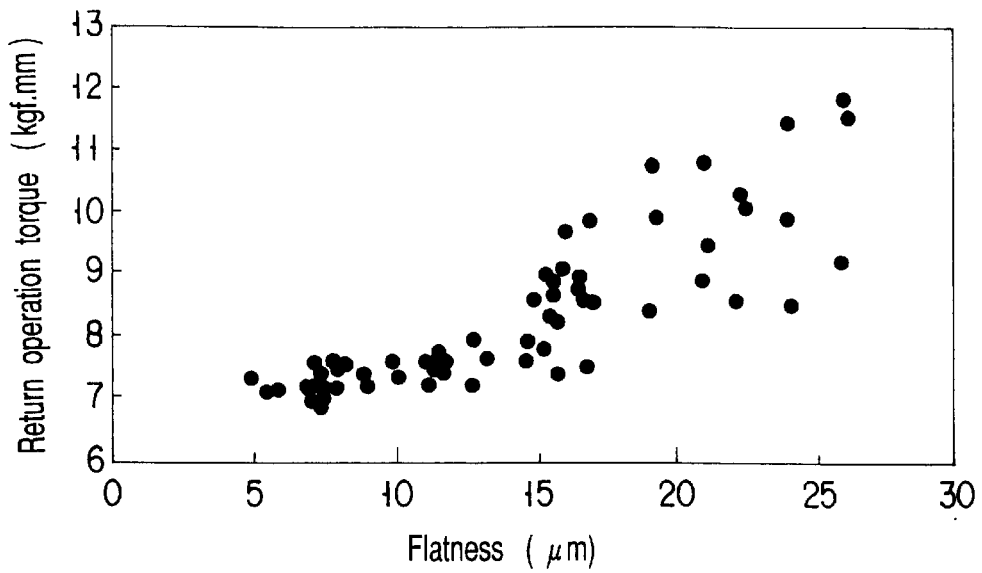
FIG. 5 is a diagram showing the relationship between the flatness of the end face of the aforesaid shaft member and the return torque of the tensioner.

FIG. 5 shows the relationship between the flatness of the end face 22 of the first shaft member 2 and the torque of return operation of the second shaft member 3 obtained when the load Z is applied. It can be seen that if the flatness is 15 μm or less, the required torque for the return operation is stabilized at a small value of about 8 kgf·mm or below, and the second shaft member 3 can satisfactorily perform the return operation.

Figure 6:
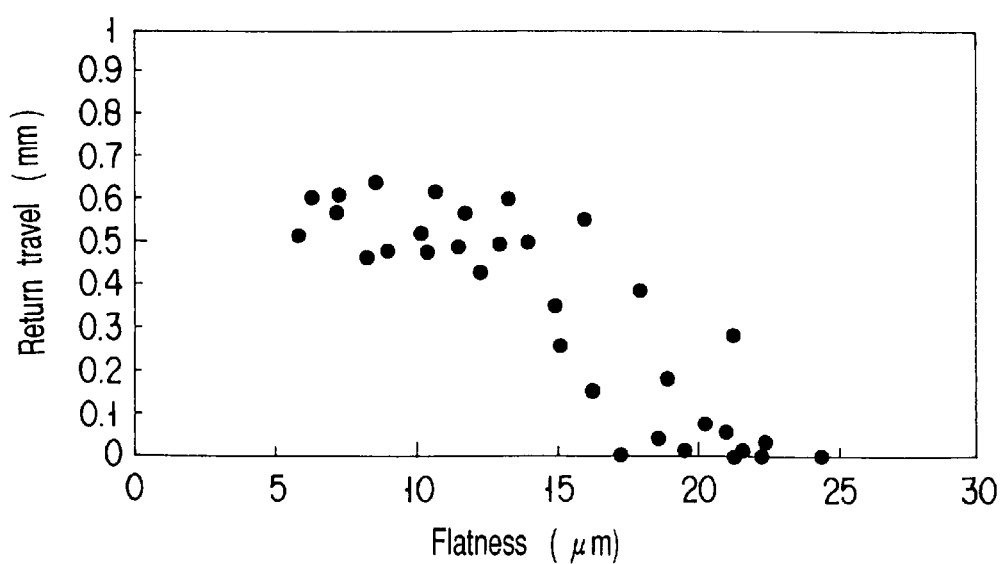
FIG. 6 is a diagram showing the relationship between the flatness of the end face of the aforesaid shaft member and the return travel of the tensioner.

FIG. 6 shows results of measurement of the return travel of the tensioner attached to a hydraulic vibration testing machine under conditions that the input load for low-rotation operation of the engine is simulated. In FIG. 6, the axis of abscissa represents the flatness of the end face 22 of the first shaft member 2. It is understandable that if the flatness is 15 μm or less, the return travel is evidently greater and the second shaft member 3 operates more smoothly than in the case where the flatness exceeds 15 μm.

Figure 7A:
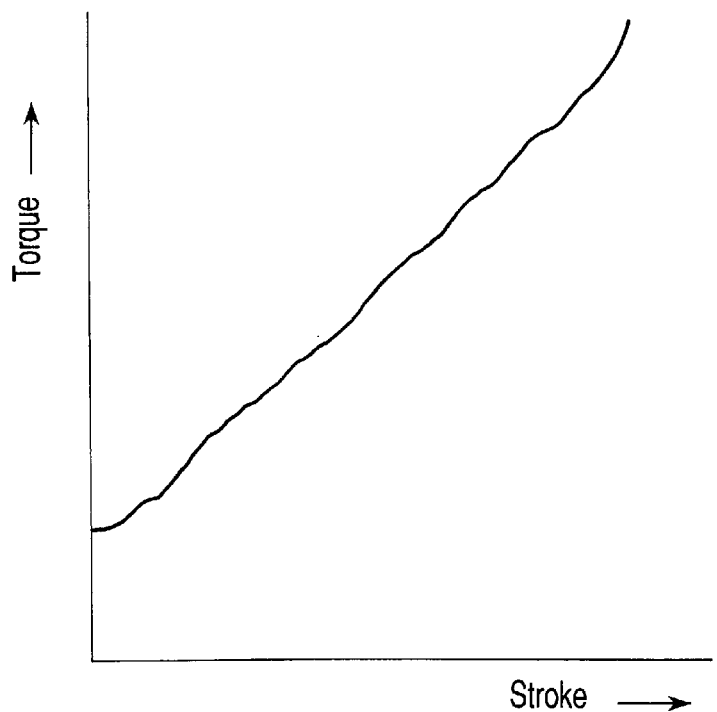
FIG. 7A is a diagram showing the relationship between the torque and return travel of the tensioner of the aforesaid embodiment.
Figure 7B:
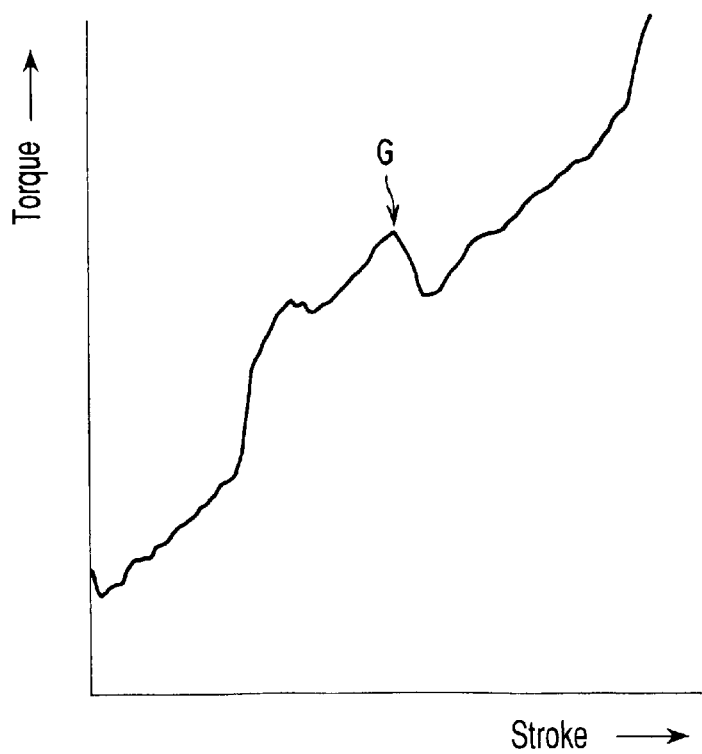
FIG. 7B is a diagram showing the relationship between the torque and return travel of a conventional tensioner.

FIGS. 7A and 7B show the relationships between the torque produced by the load Z and return travel (strokes) of the second shaft member 3. FIG. 7A shows the characteristics of tensioner of this embodiment, while FIG. 7B shows the characteristics of the conventional tensioner. In the case of the conventional tensioner, there is a spot G where the torque locally increases, and the second shaft member cannot smoothly return at the spot G. On the other hand, the tensioner of the embodiment of the present invention has characteristics such that the torque smoothly changes to ensure a smooth return operation.

Figure 8:
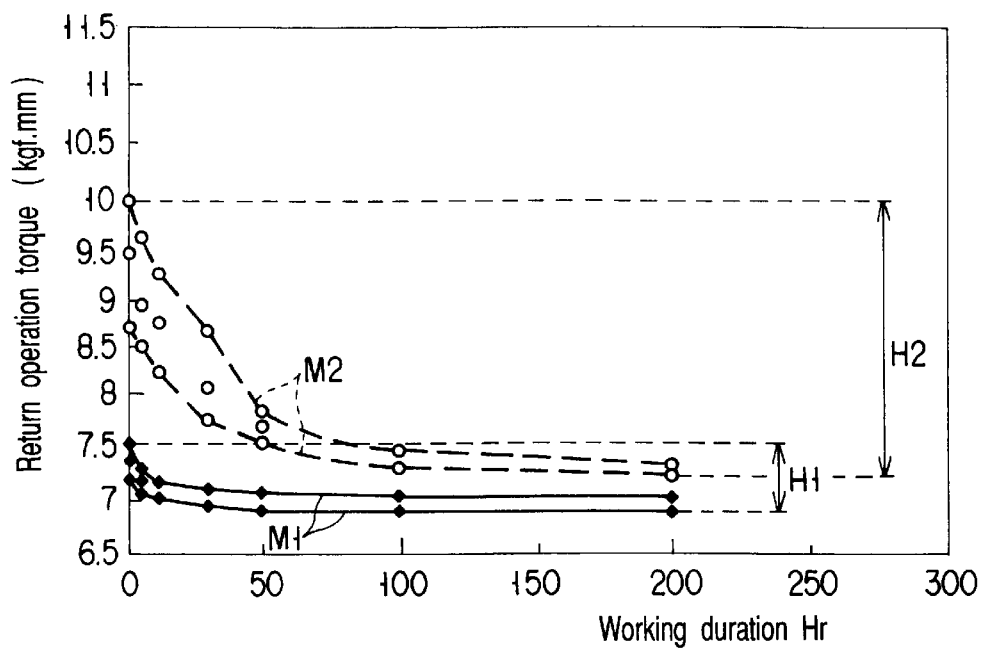
FIG. 8 is a diagram showing the relationship between the working time and return operation torque of the tensioner of the aforesaid embodiment and the conventional tensioner.

FIG. 8 shows the change of the return operation torque compared with the working time of the tensioner. In FIG. 8, full lines M1 represent the characteristics of the tensioner of the foregoing embodiment, and broken lines M2 represent the characteristics of the conventional tensioner. While variation $H_2$ of the return operation torque of the conventional tensioner is great, variation $H_1$ of the return operation torque of the tensioner of this embodiment is very small.

Thus, the conventional tensioner has a high initial return torque that it sometimes requires a running-in or the like. On the other hand, the tensioner of this embodiment can smoothly perform the return operation from the start of use.

Figure 9:
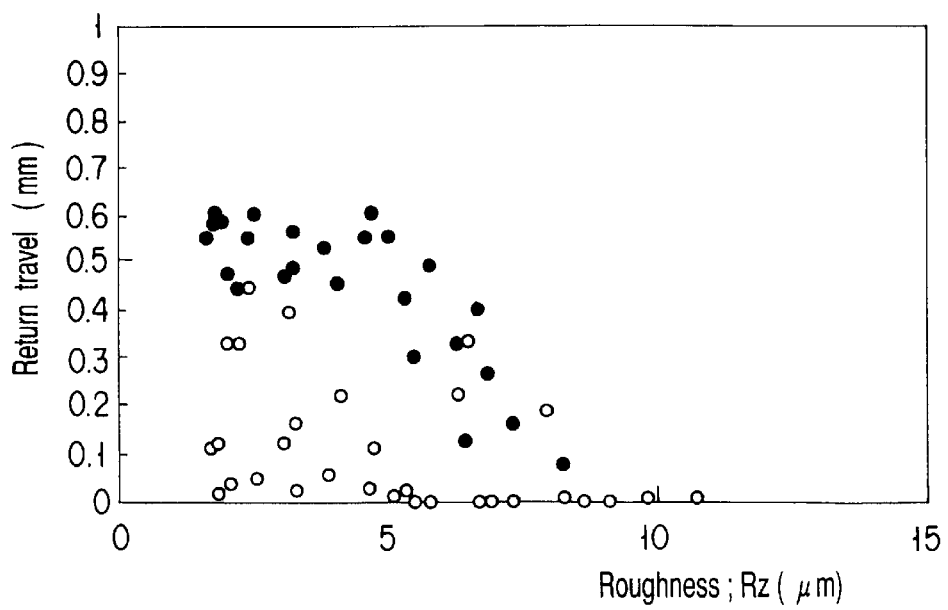
FIG. 9 is a diagram showing the relationship between the surface roughness of the end face of the first shaft member and the return travel of the tensioner of the aforesaid embodiment and the conventional tensioner.

FIG. 9 shows the relationship between the surface roughness of the end face 22 of the first shaft member 2 and the return travel of the second shaft member 3. Here the surface roughness is an arithmetic roughness that is based on Japanese Industrial Standards (JISB0601) and concerned with a plurality of measuring points that exist within a reference length on a surface as an object of measurement. For example, ten-point mean roughness (Rz) is a value in micrometers ($\mu$m) indicative of the difference between the average of the greatest to fifth-greatest top heights and the average of the greatest to fifth-greatest bottom heights that are obtained at the individual measuring points.

In FIG. 9, black circles represent results of measurement on the tensioner according to the foregoing embodiment, while white circles represent results of measurement on the conventional tensioner. In the tensioner of the foregoing embodiment, the flatness of the end face 22 of the first shaft member 2 varies within the range from 8.2 $\mu$m to 13.8 $\mu$m. In the conventional tensioner, on the other hand, the flatness of the end face varies within the range from 18.9 $\mu$m to 26.2 $\mu$m.

As shown in FIG. 9, the flatness itself of the end face of the conventional tensioner is poor even though its surface roughness is 10 $\mu$m or less, so that its return travel is unstable and limited. According to the tensioner of the embodiment of the present invention, on the other hand, the return travel is stable and substantial. In the case of the embodiment where the surface roughness and flatness are 5 $\mu$m or less and 15 $\mu$m or less, respectively, in particular, the return travel is very stable and large.

According to the foregoing embodiment, the flatness of the whole end face 22 of the first shaft member 2 is 15 $\mu$m or less. In carrying out this invention, however, the flatness of an annular portion in the circumferential direction of the end face 22 may be adjusted to 15 $\mu$m or less. In the characteristic curves a, b and c of FIG. 2, those portions which are situated substantially at equal distances from the center (near a 4,500-$\mu$m point on the axis of abscissa) of the end face 22 toward the outer periphery of the end face 22 are at equal heights. More specifically, the flatness varies under the level of 15 $\mu$m in the annular portion along the circumferential direction of the end face 22. As the portion along the circumferential direction of the end face 22 is thus adjusted to the precise flatness (15 $\mu$m or less), various parts in the circumferential direction can equally touch the contact surface 9a of the washer 9. Thus, the annular portion can uniformly receive the load Z. Even if the load Z is small, therefore, the first shaft member 2 can smoothly rotate when the load is applied to it. Thus, the return characteristic of the second shaft member 3 can be improved.

Figure 11:
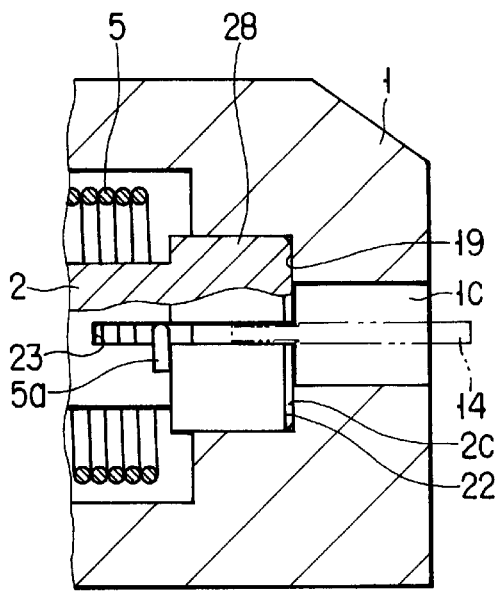
FIG. 11 is a partial sectional view of a tensioner according to a second embodiment of the present invention.
Figure 12:
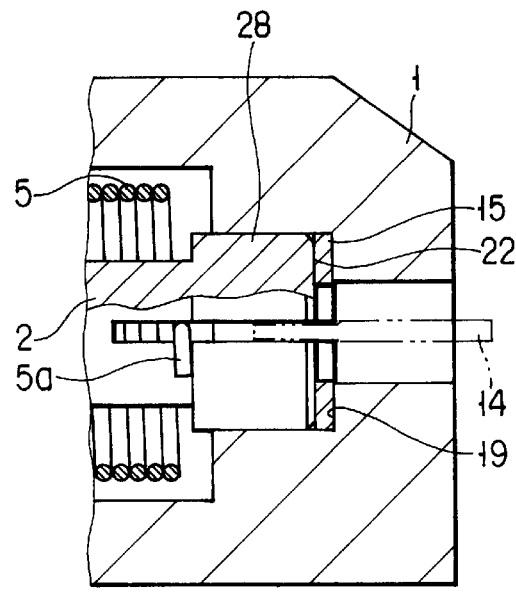
FIG. 12 is a partial sectional view of a tensioner according to a third embodiment of the present invention.

FIG. 11 shows a part of a tensioner according to a second embodiment of this invention. FIG. 12 shows a part of a tensioner according to a third embodiment of this invention. For these embodiments, common numerals for the foregoing first embodiment refer to common portions that are also used in the tensioner according to the first embodiment, and a description of those portions is omitted. In the tensioner of the second embodiment shown in FIG. 11, an end face 22 of a first shaft member 2 is brought directly into contact with a receiving surface 19 of a casing 1 without providing the aforesaid washer between the end face 22 and the receiving surface 19. In the tensioner of the third embodiment shown in FIG. 12, a ring-shaped washer 15 is located between an end face 22 of a first shaft member 2 and a receiving surface 19 of a casing 1. The end face 22 of the first shaft member 2 is in contact with the washer 15. In the second and third embodiments, the return characteristics of the tensioners can be improved in the same manner as in the first embodiment by adjusting the flatness of the whole area of the end face 22 or an annular portion along its circumferential direction to 15 $\mu$m or less.

Figure 13:
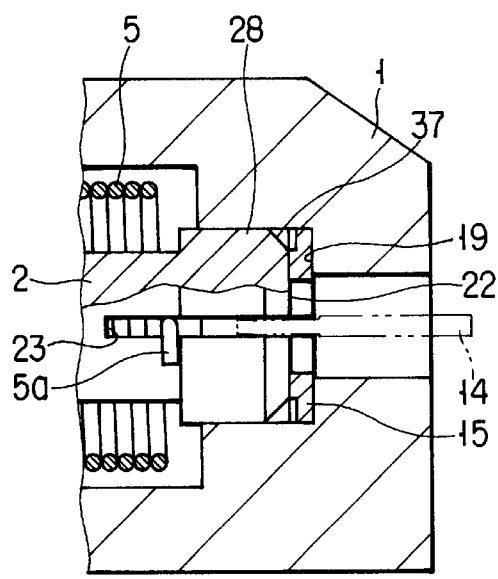
FIG. 13 is a partial sectional view of a tensioner according to a fourth embodiment of the present invention.
Figure 14:
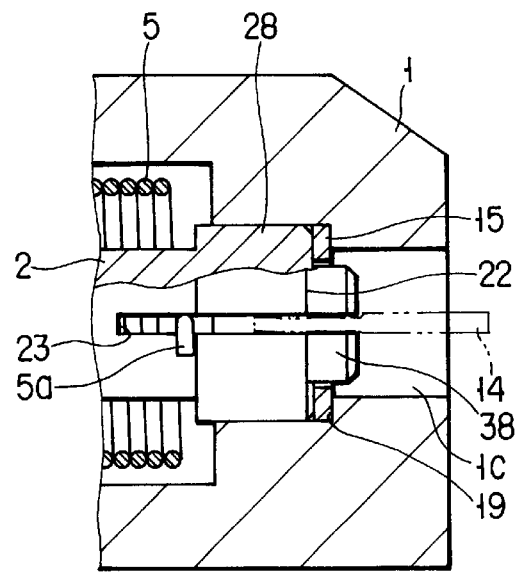
FIG. 14 is a partial sectional view of a tensioner according to a fifth embodiment of the present invention.
Figure 15:
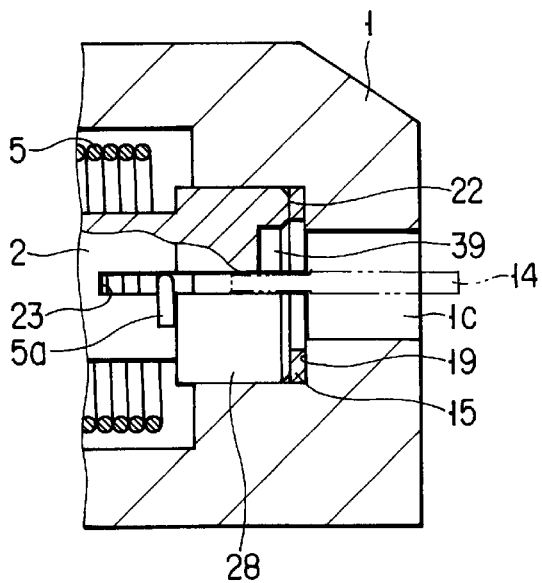
FIG. 15 is a partial sectional view of a tensioner according to a sixth embodiment of the present invention.

FIGS. 13 to 15 show further embodiments of the present invention, individually. For these embodiments, common numerals for the foregoing first embodiment refer to common portions that are also used in the tensioner according to the first embodiment, and a description of those portions is omitted. In a fourth embodiment shown in FIG. 13, a relatively great chamfer portion 37 is formed on the outer peripheral edge of an end face 22 of a large-diameter portion 28 of a first shaft member 2. This chamber portion 37 is formed by obliquely cutting the outer peripheral edge of the end face 22 at an angle of about 45°. The substantial area of the end face 22 is reduced by a margin for the formation of the chamfer portion 37. Further, a ring-shaped washer 15 is provided between the end face 22 and a receiving surface 19 of a casing 1. The washer 15 has the form of a protrusion that is in contact with the whole area of the end face 22 except the chamfer portion 37 of the first shaft member 2. The return characteristic of this tensioner can be improved by adjusting the flatness of the portion of the end face 22 in contact with the washer 15 to 15 $\mu$m or less.

In a fifth embodiment shown in FIG. 14, a protrusion 38 is formed integrally on the rear end of a large-diameter portion 28 of a first shaft member 2. This protrusion 38 is located in an opening 1C of a casing 1 in a manner such that it penetrates a ringshaped washer 15. An end face 22 of the first shaft member 2 is in contact with the washer 15 at its annular portion except the protrusion 38. The return characteristic of this tensioner can be improved by adjusting the flatness of the portion of the end face 22 in contact with the washer 15 to 15 $\mu$m or less.

In a sixth embodiment shown in FIG. 15, a recess 39 is formed in the central part of an end face 22 of a large-diameter portion 28 of a first shaft member 2. The end face 22, having the recess 39 therein, is in contact with a ring-shaped washer 15 at its annular portion except the recess 39. The return characteristic of this tensioner can be improved by adjusting the flatness of the portion of the end face 22 in contact with the washer 15 to 15 $\mu$m or less. The washer 15 is in the form of a ring corresponding to the portion of contact with the end face 22.

Figure 16:
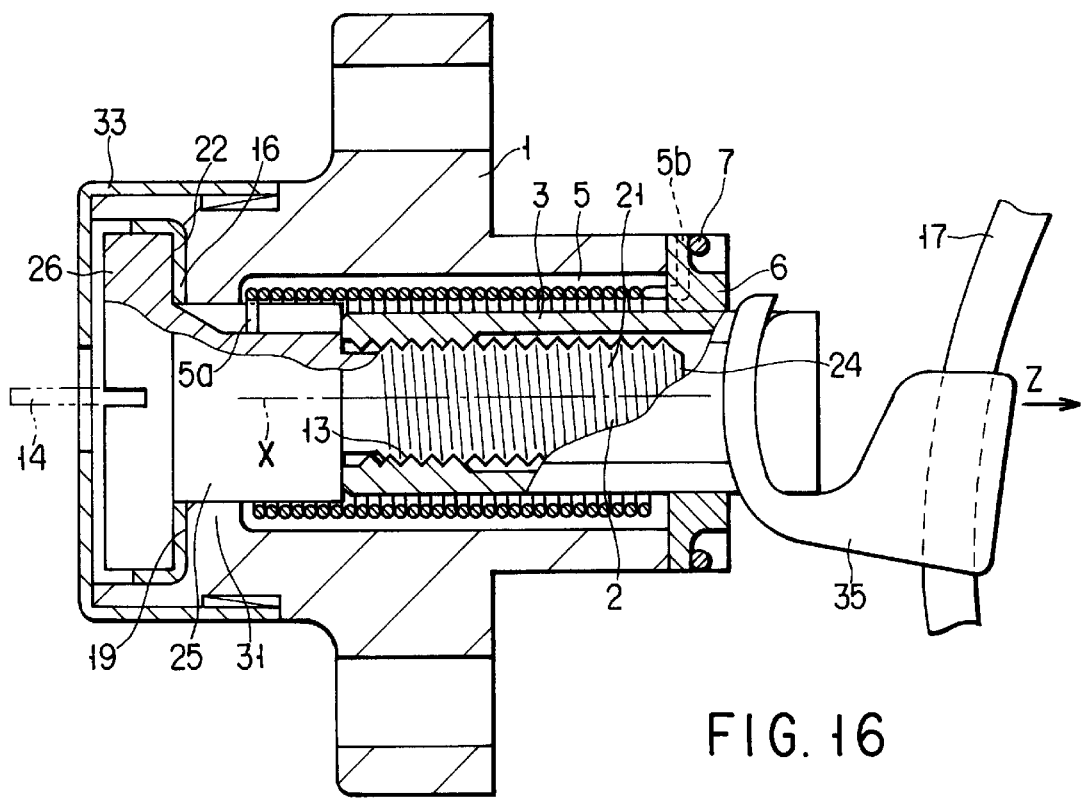
FIG. 16 is a sectional view of a pull-type tensioner according to a seventh embodiment of the present invention.

FIG. 16 shows a pull-type tensioner according to a seventh embodiment of the present invention. A first shaft member 2 of this tensioner includes a distal end portion 24 projecting toward a chain guide 17, an intermediate portion 25 formed integrally with the distal end portion 24, and a large-diameter rear end portion 26 formed integrally on the rear side of the intermediate portion 25. The distal end portion 24 is inserted in a cylindrical second shaft member 3. An external thread portion 21 is formed on the outer peripheral surface of the distal end portion 24. The external thread portion 21 is in mesh with an internal thread portion 13 that is formed on the inner surface of the second shaft member 3. The distal end portion 24 and the second shaft member 3 are inserted in a spring 5 in a manner such that the shaft members 2 and 3 are in screwed engagement with each other. The chain guide 17 is attached to a chain (not shown) for use as a force transmitting member. One end portion 5a of the torsion spring 5 is anchored to the intermediate portion 25 of the first shaft member 2. The other end portion 5b of the torsion spring 5 is anchored to a casing 1 or a bearing 6.

The spring 5 urges the first shaft member 2 in a first rotating direction. Its urging force acts in a direction such that the second shaft member 3 is drawn into the casing 1. The pull-type tensioner is completed in this manner. The distal end portion of the second shaft member 3 is coupled to the chain guide 17 by means of an arm 35. An input load Z from the chain guide 17 acts in a direction such that the second shaft member 3 is drawn out of the casing 1 along its axis X.

The rear end portion 26 of the first shaft member 2 is in the form of a flange having a diameter greater than that of the intermediate portion 25. Formed in the casing 1 is a ring-shaped extending portion 31 that can support the rear end portion 26. A washer 16 in the form of a bottomed ring is located between the extending portion 31 and the rear end portion 26. The rear end portion 26 of the first shaft member 2 has an end face 22 that touches the washer 16.

In this embodiment, the flatness of the whole end face 22 or an annular portion along the circumferential direction is adjusted to 15 μm or less. By doing this, the first shaft member 2 of the pull-type tensioner can rotate smoothly even though the input load Z is small. In this case, the return characteristic of the second shaft member 3 is also improved.

Figure 17:
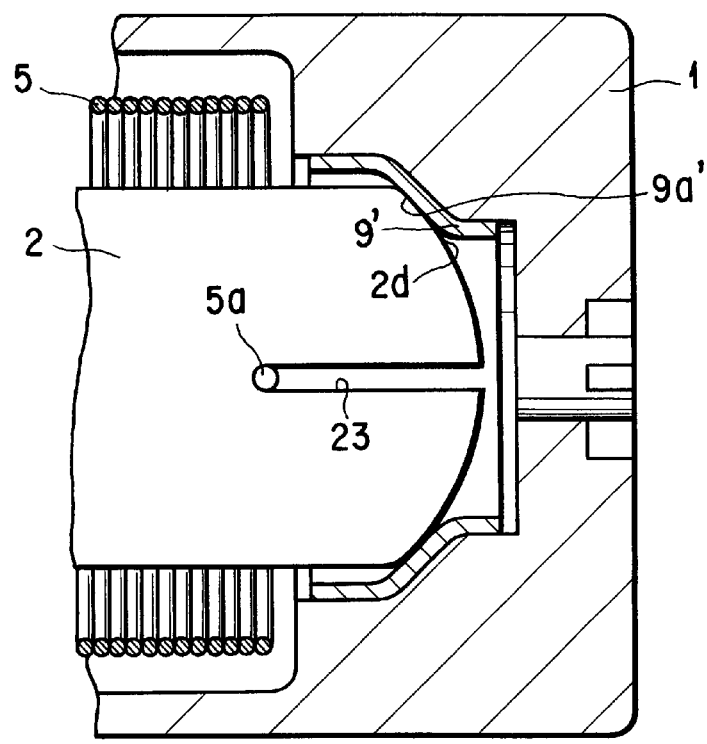
FIG. 17 is a partial sectional view of a tensioner according to an eighth embodiment of the present invention.

FIG. 17 shows an eighth embodiment of this invention. An end face 2d of a first shaft member 2 of this tensioner is formed of a spherical surface. A washer 9' that is touched by this end face (spherical surface) 2d has a contact surface 9a' that is inclined like a cone. In the case of this embodiment, the same effects of the foregoing embodiments can be produced by adjusting the flatness of at least an annular portion in the circumferential direction of the end face 2d that is in contact with the washer 9' to 15 μm or less.

Figure 18:
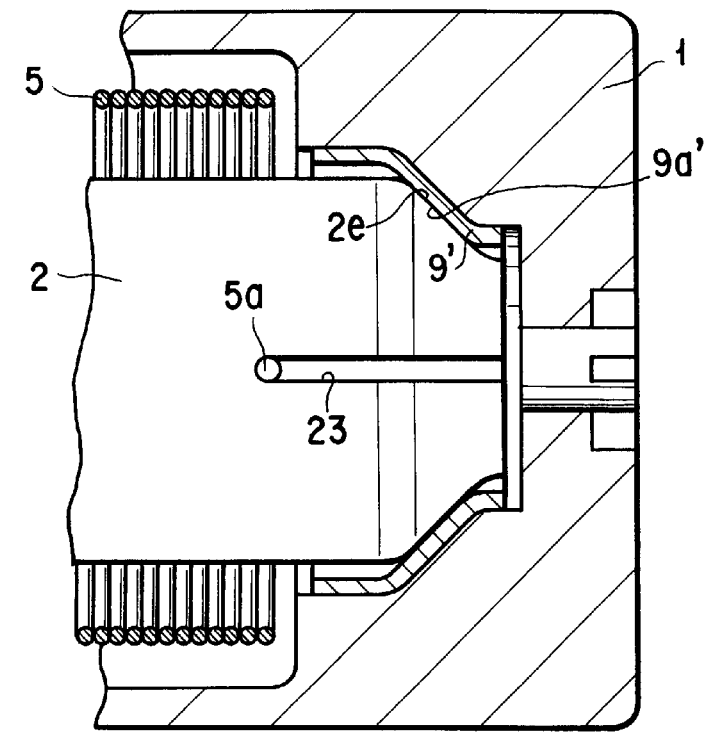
FIG. 18 is a partial sectional view of a tensioner according to a ninth embodiment of the present invention.

FIG. 18 shows a ninth embodiment of this invention. An end face 2e of a first shaft member 2 of this tensioner is formed of a tapered conic surface. A washer 9' that is touched by this end face (conic surface) 2e has a contact surface 9a' that is inclined like a cone. In the case of this embodiment, the same effects of the foregoing embodiments can be produced by adjusting the flatness of at least an annular portion in the circumferential direction of the end face 2e that is in contact with the washer 9' to 15 μm or less.

In each of the embodiments described above, the flatness of the end face of the first shaft member is adjusted to 15 μm or less. In carrying out the present invention, the flatness of the surface of the washer that is touched by the end face of the first shaft member or the receiving surface of the casing, like that of the end face of the first shaft member, may be adjusted to 15 μm or less. By doing this, the return characteristic of the tensioner can be improved further.

As is evident from the above description, the present invention is suitably applicable to a tensioner for applying tension to a force transmitting member such as a camshaft driving chain or timing belt of an engine mounted in a vehicle, e.g., a four-wheeler, two-wheeler, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A tensioner for applying tension to a force transmitting member, comprising:

a casing;

a first shaft member rotatably stored in said casing so as to be restrained from moving along an axis;

a second shaft member in screwed engagement with said first shaft member, movable in the direction of the axis, restrained from rotating relatively to said casing, and subjected to a load in the direction of the axis from the force transmitting member; and a spring stored in said casing and capable of applying turning force to said first shaft member, wherein a slit extending in the diametrical direction of said first shaft member is formed in an end face of said first shaft member, said end face touching a receiving surface of said casing directly or across a washer and receiving said load acting on said second shaft member, the flatness of the end face of said first shaft member ranging from 1.5 μm to 15 μm.

2. A tensioner according to claim 1, wherein said end face of said first shaft member is formed having a chamfer portion on the outer peripheral edge thereof, the flatness of the whole end face except the chamfer portion being 15 μm or less.

3. A tensioner according to claim 1, wherein the flatness of an annular portion of said end face extending in the circumferential direction thereof is 15 μm or less.

4. A tensioner according to claim 1, wherein the surface roughness of the end face of said first shaft member ranges from 1.5 μm to 5 μm.

5. A tensioner according to claim 2, wherein the surface roughness of the end face of said first shaft member ranges from 1.5 μm to 5 μm.

6. A tensioner according to claim 3, wherein the surface roughness of the end face of said first shaft member ranges from 1.5 μm to 5 μm.

7. A tensioner according to claim 1, wherein said washer is provided between the end face of said first shaft member and the receiving surface of said casing.

8. A tensioner according to claim 1, wherein said end face of said first shaft member is directly in contact with the receiving surface of said casing.

9. A tensioner according to claim 1, wherein said end face of said first shaft member is formed having a recess in the central part thereof, the flatness of an annular portion around said recess being 15 μm or less.

10. A tensioner according to claim 1, wherein said end face of said first shaft is a spherical surface, and an opposite-side contact surface in contact with said end face of said first shaft member is inclined like a cone.

11. A tensioner according to claim 1, wherein said end face of said first shaft is a conical surface, and an opposite-side contact surface in contact with said end face of said first shaft member is inclined like a cone.

* * * * *